Jan. 7, 1969  B. NORTON  3,420,688

METHOD OF PRODUCING IMMERSED BOLOMETERS

Filed May 26, 1965

INVENTOR.
BRUCE NORTON

BY

ATTORNEY

United States Patent Office 3,420,688
Patented Jan. 7, 1969

3,420,688
METHOD OF PRODUCING IMMERSED
BOLOMETERS
Bruce Norton, Westport, Conn., assignor to Barnes Engineering Company, Stamford, Conn., a corporation of Delaware
Filed May 26, 1965, Ser. No. 459,020
U.S. Cl. 117—9                                              10 Claims
Int. Cl. H01c 7/04

ABSTRACT OF THE DISCLOSURE

Immersed thermistor bolometers are made by applying a low melting glass such as an arsenic modiled selenium glass to the back of the immersion lens, placing a thermistor flake thereon, and a weight with a notch deep enough so that when the glass is heated and softens, the flake is immersed to a definite accurately predetermined point, because at that point the edges of the notch strike the lens. The notch is, of course, deeper than the thickness of the flake. Low noise bolometers of uniform response are reliably prepared.

Background of the Invention

Thermistor bolometers are used very extensively as detectors of infrared radiation, particularly longer wavelength infrared. Thermistors initially were made from mixtures of oxides of manganese and nickel, or manganese, nickel and cobalt. These oxide thermistors are still very extensively used as detectors of infrared radiation. In order to increase the responsivity of thermistor bolometers, the thermistor flakes have been immersed on lenses which have increased responsivity by a factor almost equalling the refractive index of the lens material for a hemispherical immersion lens, and to an even greater degree in hyperhemispheres where the thermistor flake is immersed on the rear surface of a lens at a point beyond the center of curvature of the spherical front surface of the lens. The lens, which is usually of material of good thermal diffusivity, also acts as a heat sink. Immersed thermistor bolometers have become standard for instruments where the highest bolometer responsivity is needed, and are described and claimed in the patent to Wormser 2,983,888, May 9, 1961.

The immersion lens may be of dielectric material such as fused aluminum oxide, referred to loosely as sapphire, or it may be a semiconductor such as germanium and silicon. The latter two are more extensively used because of the enormous refractive index, which reaches 4 for germanium, and therefore gives immersed bolometers maximum responsivity. When immersion lenses of germanium or silicon are used, they will obviously short circuit a thermistor flake if in contact therewith, and so it is standard practice to interpose a very thin layer of an insulating material which is preferably a glass-like material of selenium modified with arsenic, and for bolometers of slightly higher ambient temperature tolerance, other glasses, such as 4-component glasses, are used, which materials are described and claimed in the patent to Karlson and Kiernan, No. 3,121,208, Feb. 11, 1964.

It should be noted that the immersion glass also performs an additional function, namely that of providing a path of moderate thermal impedance between the thermistor flake and the lens which acts as a heat sink. One of the factors influencing the responsivity of an immersed bolometer is the thermal impedance between the thermistor flake and the heat sink formed by the lens. Other factors being equal, responsivity increases with thermal impedance. Therefore, immersion compositions such as immersion glasses are also useful in immersed bolometers using dielectric lenses such as sapphire, even though the electrical insulating properties of the glass are not needed in such cases.

Immersing flakes on a lens material such as germanium involves a number of things, many of which are of extreme delicacy and have to be carried out under a microscope. In general, sheets of a paste of the oxides are made up, cut into tiny flakes of the desired size, and then sintered and annealed. The flakes are also quite thin, for example of the order of $10\mu$ or less, and are very fragile. It is necessary to deposit such materials as gold on a masked thermistor flake to produce lead areas to which leads, such as fine platinum wire, may be attached. This may be done by embedding the wire in a pasty material before firing or sintering. In any event, the areas covered by the lead attachments are thicker than the active portion of the thermistor flake, and are sometimes irreverently referred to as "mush balls" from their appearance under a microscope.

An area on the back of the immersion lens where the flakes are to be mounted is coated with a thin film which may be, for example, about $12\mu$ of immersion glass, such as an 80/20 arsenic-modified selenium glass. This layer is commonly deposited by vacuum deposition, but as will appear, as far as the present invention is concerned, the method used in laying down the thin film of the immersion glass is not material. Each thermistor flake, in turn, is placed on the immersion glass layer, a weight placed thereon, and the flake-weight assembly centered on the optical-mechanical axis of the lens. The pre-immersion bolometer assembly is placed in an oven and the temperature raised to the softening point of the immersion glass, which may range from about 100° C. up, and the weights cause the thermistor flake to sink slowly in the softened immersion glass until the spacing from the back of the lens has reached the desired value, whereupon the heat is turned off, and the bolometer is slowly cooled. The immersion is an exceedingly delicate operation, and requires continuous observation by highly skilled personnel through a suitable window in the heating furnace.

In spite of the greatest care by the skilled technicians, it has been practically impossible in the past to produce immersed bolometers of uniform characteristics, and there are many rejects for other reasons which will be set out below. The result is that labor costs are greatly increased, and where a reject is produced, the flakes have to be destroyed, the coating removed and replaced, involving still further costs. As a result, good immersed bolometers are quite expensive, and even when perfect, are not of as uniform responsivity as is desired. This requires matching where an instrument needs more than one immersed bolometer of matched responsivity, which further adds to the cost of immersed bolometer inventory. Nevertheless, this was the best that could be done, and so it is common to mark responsivity of each immersed bolometer.

Before discussing the two aspects of the present invention, it is appropriate to bring out the nature of some of the poor results obtained in the past, apart from the impossibilty of even the most skilled operator producing bolometers of exactly uniform thermal impedance layers of immersion glass. If the weight ends up somewhat cocked either by reason of mechanical offset due to unequal electrode areas on the flake or, more commonly, lack of absolutely uniform softening of the immersion glass, bolometers are produced in which the thickness of the immersion glass layer between the flake and the lens is not uniform over the whole extent of the active portion of the flake. Such a bolometer is useless for precise measurements of targets so small that their image covers less than the whole of the flake area.

Another problem is presented by temperature. If the oven is too hot, there may be temperature gradients in the immersion glass layer producing the undesirable non-uniformity referred to above, and even if this does not occur, the glass may soften so fast that producing a number of bolomters with the same thermal impedance is made much more diffiult, or the flake may even touch or almost touch the lens which, at best, results in a very noisy bolometer. Accordingly, it is customary to use relatively low temperatures, for example 110° C. This results in a greatly lengthened time, and since the highly skilled technician must watch closely during the immersion of the flake, this adds substantially to the cost.

A further problem is presented when the bolometers are heated in an oven. Cooling should be very gradual; otherwise the immersion glass layer and flake may cool more rapidly than the lens, and set up strains which, in the worst cases, eventually result in peeling or lifting of the immersion glass layer from a portion of the lens. Even when this extreme result does not occur, the strains may result in microscopic cracks or other non-uniformities in the flake which produce noisy bolometers that are useless for most instruments because, in a great many cases, one of the most important factors in an instrument is signal-to-noise ratio, and a noisy bolometer can therefore not be tolerated. Noise can also result from an imperfect contact of the immersion glass with the surface of the flake. Under high magnification, the flake surface is extremely rough, and unless the immersion glass completely fills the microscopic valleys, a non-uniform bolometer or a more noisy bolometer, or both, may result. This last factor is greatly aggravated if the immersion has to be carried out at lower temperatures, which is necessary in order to avoid the other problems of too high an oven temperature. Sometimes this phenomenon is referred to as "incomplete wetting" of the flake, although technically it is more a phenomenon of inadequate fluidity of the immersion glass.

SUMMARY OF THE INVENTION

The present invention encompasses two variants or aspects, either one of which can be used alone, as they perform different functions. It is also possible, and is preferred, to use both aspects or variants of the invention at the same time, in order to produce the most desirable results. The two aspects are entirely different, but as they can be combined in one preferred modification, both are included in the present application.

The first aspect of the invention is the use of a weight with an accurate notch in the place where the thermistor flake is contacted. This phase of the invention makes it practically impossible to produce a bolometer with a non-uniform thickness of immersion material between the flakes and the lenses, and completely eliminates any skilled technical supervision during the operation. The weight causes the flake to sink in the immersion glass until the portions of the weight on either side of the notch or groove strike the lens surface. Then the weight can sink no further, and the layer between the flake and the lens is absolutely uniform and is equal for each bolometer. The grooved or notched weights must, of course, be made precisely, but this presents no problem for precision metal working. As the weights are used over and over again, any increased cost for the precisely dimensioned grooving becomes completely negligible over a year's operation. It is further possible to have an inventory of weights of varying groove depths and bar widths to produce bolometers of differing responsivities and flake sizes, but each responsivity is highly uniform. It should be noticed that the automatic proportioning of the immersion glass layer thickness by the above described aspect of the invention results regardless of temperature and fluidity of immersion glass. Therefore higher temperatures can be used, and are limited only by problems of cooling or lifting of glass from the immersion lens.

The second aspect of the present invention, which can also be used without the first, is to dispense with an oven altogether, and to heat the weight itself inductively. This avoids heating up the lens to any considerable extent, and so the problems of strains resulting from differential cooling are minimized. It is an advantage of the combined preferred embodiment of the invention when both weight heating and notched weights are used, that the heating can be extremely rapid, with concomitant lowered production costs. It should be noted that the exact dimensions of the induction heating coils are not critical. If they are somewhat oversized so that a portion of the lens itself is included in the fluctuating electric field in the coil, there is still no serious problem, because even when the lens has conductivity as in the case of silicon and germanium lenses, the conductivity is much lower than that of the weight, which may be tungsten, stainless steel, or other material of relatively high electrical conductivity. As a result there will be little heating of the lens, and the problem presented by an oven does not arise. The fact that the size of the induction heating coil is not critical is an added practical advantage of the present invention.

Wherever a modified selenium glass or other similar low-melting material is used as an immersion layer between the lens and the thermistor flake, the problems solved by the present invention are involved, and so, of course, the invention is applicable regardless of the nature of the material of the imersion lens. Because of the widespread use of immersion lenses of silicon, and particularly germanium, the invention will be described specifically in connection with such lenses, but is applicable regardless of the nature of the lens material.

Immersed bolometers usually use two thermistor flakes in series in a bridge circuit. One of the flakes normally receives radiation, and the other is shielded from radiation and constitutes a compensating flake to compensate for changes in ambient temperature. The present invention is applicable to the immersion of all thermistor flakes and therefore will be described only in conjunction with the active flake. Some immersed bolometers have been prepared with more than two thermistor flakes, and of course the present invention is applicable to the manufacture of such immersed bolometers also.

As the improved manufacturing process of the present invention is not concerned with any particular immersion glass, the descriptions below will deal with a very common composition havng about 80% selenum and 20% arsenic. The invention, of course, is applicable to immersion bolometers having other immersion glasses.

DESCRIPTION OF THE PREFERRED EMBODIMENTS

Figure 1:
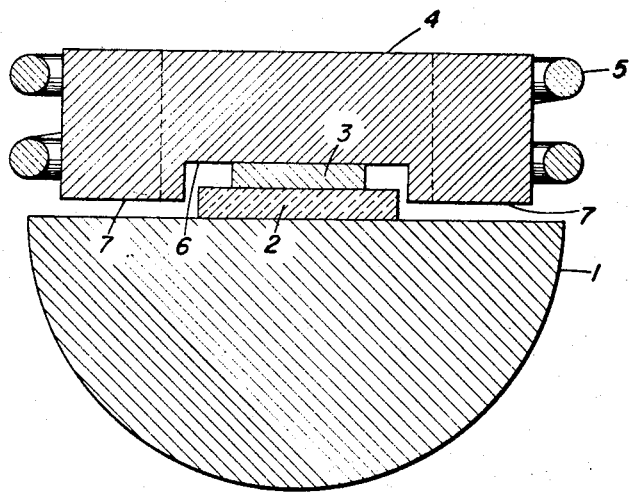
FIG. 1 is a section through a weight and immersed bolometer.

In FIG. 1, an immersion lens 1 of germanium, shown for illustration as an ordinary hemispherical immersion lens, although a hyperimmersion lens can be used with the same effectiveness, has deposited thereon a layer 2 of 80/20 arsenic-modified selenium glass of about 12μ. On this is the thermistor itself 3 and the weight 4 is shown at the moment when it is first applied. This weight is illustrated as being heated by an induction coil 5, only the coil itself being shown. The weight heats up rapidly, and causes softening of the glass under the flake, which sinks and becomes immersed in the layer 2. The weight has a precision groove 6 and 7 which permit it to sink down until the ends 7 strike the lens. Therefore, regardless of how fast the immersion takes place, it stops at the same point with the production of a predetermined thickness of immersion glass and therefore a predetermined thermal impedance. The germanium lens is not significantly heated, so that the problems of glass lifting or strains in the flake and/or immersion material, which would produce rejectable bolometers or noisy ones, are minimized. Fairly high temperatures can be used with complete safety, for example 140–150° C., and immersion is very fast, ranging from 3 to 5 mintues instead of the more common 60 to 120 minutes.

Figure 2:
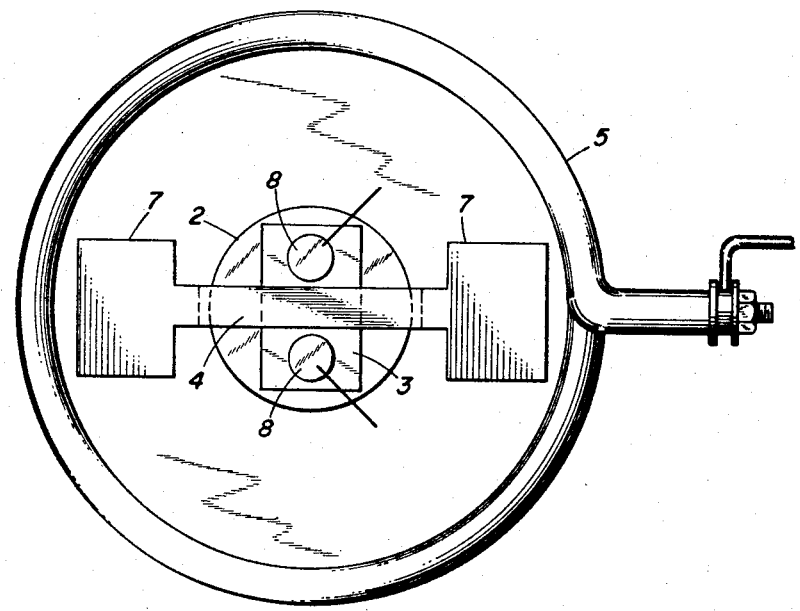
FIG. 2 is a plan view of a weight on top of the flake.

FIG. 2 shows a preferred shape of weight with a narrow portion between two wider ends. This narrow portion fits between the electrode areas 8 on the thermistor flake. Even without this precise application of weight to the area of the flake not covered by lead electrodes, a uniform average thickness would result, but there is some possibility that the flake might be slightly cocked if the thicknesses of the two lead attachment areas were not equal. The preferred shape shown in FIG. 2 has the additional advantage that the thinner portion heats up more rapidly, and still further prevents excessive heating of the lens. For clarity in the drawings the thickness of the immersion glass and thermistor flake have been greatly exaggerated.

Instead of using induction heating, the notched weight may be used in an oven, and complete uniformity of layer thickness results, even in such a case. The following tests were made, at a temperature of 130° C. for 30 min. plus 150° C. for 30 min., and at 140°–150° C. for 60 min., two tests being made at the latter temperature and time. One of the best ways of testing for uniformity is to measure the so-called peak voltage, that is to say the voltage at which thermal run-away of a bolometer will just start. This is a precise point, and is used rather than the operating voltage point which is normally about .6 as great. When tested by the peak voltage method, the three bolometers, referred to above, showed peak voltages of 146, 150, and 151 v. D.C. respectively. For all practical purposes these were uniform bolometers, as the variation in peak voltage was within the experimental accuracy of the measurements made.

Another bolometer was made with the induction heating method, the weight only being heated. Immersion time was about 3 minutes, and the resistance of the bolometer at 25° C. was $6.11 \times 10^5$ ohms. Peak voltage was 155 v. and noise, with and without applied bias of 45 v., was 1.0 and .7 μv. respectively. Time constant was 2.8 milliseconds The bolometer was then tested for layer lifting by the very drastic test of temperature cycling. The ambient temperature was 75° F. and it was cycled at the rate of 3° F. per minute down to −35 F., held there for an hour, heated up at the same rate to 170° F., held for a half hour, then cycled back to the −35° F., held for 1½ hours, then again heated to 170° F. at the same rate, held for a half hour, and finally brought back to ambient temperature. No flake lifting was observable, the resistance was $6.1 \times 10^5$ ohms, peak voltage was 160, noise without bias .81, and with 45 v. bias, .93, and time constant 2.7 milliseconds. It will be seen that there was no degradation in quality after the drastic temperature cycling, and the operating time for flake immersion was drastically reduced. At the same time, the same advantages of precise thickness end point can be achieved without any skilled supervision.

I claim:

1. A process of immersing oxide thermistor flakes on an immersion lens of infrared transmitting material having a coating of low-melting immersion glass which comprises placing the flake on the immersion glass layer and placing a weight on the flake, the weight having a notch at the point contacting the flake, and having portions outside the notch area; the depth of the notch being greater than the thickness of the flake and the notch volume being sufficiently greater than the total volume of the flake and glass layer so that the portions outside the notch area can strike the lens, and subjecting the immersion lens and flake to a temperature sufficiently high to soften the immersion glass and for a time sufficient for the weight to force the flake into the immersion glass until the portions of the weight outside the notch area strike the immersion lens.

2. A process according to claim 1 in which the area over the notch of the weight is dimensioned to approximate the area of the tranmistor between lead attachments.

3. A process according to claim 1 in which the immersion glass is an arsenic-modified selenium glass.

4. A process according to claim 2 in which the immersion glass is an arsenic-modified selenium glass.

5. A process according to claim 1 in which the temperature is produced by induction heating of the weight, and the latter is of electrically conducting material.

6. A process according to claim 2 in which the temperature is produced by induction heating of the weight, and the latter is of electrically conducting material.

7. A process according to claim 3 in which the temperature is produced by induction heating of the weight, and the latter is of electrically conducting material.

8. A process according to claim 4 in which the temperature is produced by induction heating of the weight, and the latter is of electrically conducting material.

9. A process according to claim 1 in which the immersion lens is made of a semiconductor selected from the group consisting of germanium and silicon.

10. A process according to claim 4 in which the immersion lens is made of a semiconductor selected from the group consisting of germanium and silicon.

References Cited

UNITED STATES PATENTS

| | | | |
|---|---|---|---|
| 2,379,919 | 7/1945 | Miller et al. | 117—21 X |
| 2,587,674 | 3/1952 | Aiken | 338—18 |
| 2,966,646 | 12/1960 | Baasch | 338—22 |
| 2,983,888 | 5/1961 | Wormser | 338—18 |
| 2,994,053 | 7/1961 | De Waard | 338—18 |
| 3,010,157 | 11/1961 | Cizek | 18—48 |
| 3,012,212 | 12/1961 | Hicks | 338—18 |
| 3,059,113 | 10/1962 | McHenry | 338—18 |
| 3,121,208 | 2/1964 | Karlson et al. | 338—18 |
| 3,186,860 | 6/1965 | Jones | 117—21 |
| 2,619,753 | 12/1952 | Lorie | 117—38 X |

WILLIAM D. MARTIN, *Primary Examiner.*

PAUL ATTAGUILE, *Assistant Examiner.*

U.S. Cl. X.R.

29—464; 117—200; 338—18, 21